(12) United States Patent
Kawakita

(10) Patent No.: US 10,075,745 B2
(45) Date of Patent: Sep. 11, 2018

(54) CONTENT SENDING DEVICE AND CONTENT SENDING METHOD

(71) Applicant: FUNAI ELECTRIC CO., LTD., Osaka (JP)

(72) Inventor: Mitsuru Kawakita, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/331,913

(22) Filed: Oct. 23, 2016

(65) Prior Publication Data

US 2017/0118494 A1    Apr. 27, 2017

(30) Foreign Application Priority Data

Oct. 26, 2015  (JP) ................. 2015-209536

(51) Int. Cl.
| | |
|---|---|
| *H04N 21/81* | (2011.01) |
| *H04N 21/235* | (2011.01) |
| *H04L 29/08* | (2006.01) |
| *H04N 21/2343* | (2011.01) |
| *H04N 21/24* | (2011.01) |
| *H04N 21/84* | (2011.01) |
| *H04N 21/25* | (2011.01) |
| *H04N 21/8355* | (2011.01) |

(52) U.S. Cl.
CPC ........... *H04N 21/235* (2013.01); *H04L 67/02* (2013.01); *H04N 21/2343* (2013.01); *H04N 21/2407* (2013.01); *H04N 21/25* (2013.01); *H04N 21/8355* (2013.01); *H04N 21/84* (2013.01)

(58) Field of Classification Search
CPC ............... H04L 12/1886; H04L 67/02; H04N 21/43615; H04N 21/2402; H04N 5/765; H04N 21/4135; H04N 21/2343; H04N 21/2407; H04N 21/25; H04N 21/8355; H04N 21/84; H04N 21/235
USPC ........................................... 725/116
See application file for complete search history.

(56) References Cited

U.S. PATENT DOCUMENTS

| | | | |
|---|---|---|---|
| 8,079,053 B2 | 12/2011 | Yampanis et al. | |
| 8,544,046 B2 * | 9/2013 | Gran ................. | G06F 17/30038 709/216 |
| 2001/0052910 A1 * | 12/2001 | Parekh .................. | G06F 17/211 715/744 |
| 2003/0046704 A1 * | 3/2003 | Laksono ............ | H04N 7/17336 725/96 |
| 2005/0066353 A1 * | 3/2005 | Fransdonk ............ | H04L 63/083 725/29 |

(Continued)

FOREIGN PATENT DOCUMENTS

JP    2010-033277    2/2010

*Primary Examiner* — Nathan J Flynn
*Assistant Examiner* — Cynthia M Fogg
(74) *Attorney, Agent, or Firm* — JCIPRNET

(57) ABSTRACT

A content sending device is provided, having a communication part, a storage part and a controller. The communication part is connectable to an external device. The storage part stores a content and an attribute information of the content. The controller sends the content based on a request from the external device. If the controller is unable to send the content, the controller sends the attribute information comprising a predetermined operation instruction to the external device and executes an operation based on the predetermined operation instruction from the external device.

17 Claims, 13 Drawing Sheets

```
<item id ="UNTRANS_001"parentID="AAA"restricted="1">
<dc:title> stop distribution for DMP_A </dc:title>
</item>
<item id ="UNTRANS_002"parentID="AAA"restricted="1">
<dc:title> stop distribution for DMP_B </dc:title>
</item>
<item id ="UNTRANS_003"parentID="AAA"restricted="1">
<dc:title> make a reservation for distribution </dc:title>
</item>
```

(56) References Cited

U.S. PATENT DOCUMENTS

| | | | |
|---|---|---|---|
| 2007/0070828 A1* | 3/2007 | Watanabe | G11B 19/02 369/30.19 |
| 2007/0260678 A1* | 11/2007 | Fukui | H04L 12/2803 709/203 |
| 2010/0046918 A1 | 2/2010 | Takao et al. | |
| 2011/0099582 A1 | 4/2011 | Howcroft et al. | |
| 2015/0012946 A1* | 1/2015 | Woods | H04N 21/84 725/41 |
| 2015/0163214 A1* | 6/2015 | Sakai | G06F 17/30 726/6 |

* cited by examiner

```
<item id ="9010_/AAA22"parentID="AAA"restricted="1">
<dc:title> NNN news  </dc:title>
</item>
<item id ="9011_/AAA23"parentID="AAA"restricted="1">
<dc:title> E variety    </dc:title>
</item>
```

```
<item id ="UNTRANS_001"parentID="AAA"restricted="1">
<dc:title> stop distribution for DMP_A  </dc:title>
</item>
<item id ="UNTRANS_002"parentID="AAA"restricted="1">
<dc:title> stop distribution for DMP_B  </dc:title>
</item>
<item id ="UNTRANS_003"parentID="AAA"restricted="1">
<dc:title> make a reservation for distribution  </dc:title>
</item>
```

```
<item id ="UNTRANS_011"parentID="AAA"restricted="1">
<dc:title> dubbing     </dc:title>
</item>
<item id ="UNTRANS_012"parentID="AAA"restricted="1">
<dc:title> stop dubbing     </dc:title>
</item>
```

```
<item id ="UNTRANS_021"parentID="AAA"restricted="1">
<dc:title> lower the bit rate of DMP_A   </dc:title>
</item>
<item id ="UNTRANS_022"parentID="AAA"restricted="1">
<dc:title> lower the bit rate of DMP_B   </dc:title>
</item>
<item id ="UNTRANS_023"parentID="AAA"restricted="1">
<dc:title> lower all bit rates           </dc:title>
</item>
```

CONTENT SENDING DEVICE AND CONTENT SENDING METHOD

CROSS-REFERENCE TO RELATED APPLICATION

This application claims the priority benefit of Japan application serial no. 2015-209536, filed on Oct. 26, 2015. The entirety of the above-mentioned patent application is hereby incorporated by reference herein and made a part of this specification.

BACKGROUND OF THE INVENTION

Field of the Invention

The invention relates to a content send device that sends a content in accordance with a protocol, such as UPnP AV.

Description of Related Art

The protocol of UPnP AV of DLNA (Digital Living Network Alliance), etc., is known as the standard for connecting household devices via a network. In the UPnP AV, a content sending device (e.g., server) sends or distributes a content as a part of the service and a client reproduces the content distributed from the content distribution device.

The client requests meta information of the content in order to obtain a list of the contents that the content distribution server can distribute. For example, in the DLNA, the request for the meta information is defined as a request for browse. The content distribution server that has received the request for the meta information sends all or a part of the meta information of the content to the client. The client interprets the meta information and displays a UI screen to be used by the user for selection of the content and so on (see Patent Literature 1, for example).

PRIOR ART LITERATURE

Patent Literature

Patent Literature 1: Japanese Patent Publication No. 2010-33277

If the content distribution server receives the request for browse from the client while the content distribution server is unable to perform content distribution, the content distribution server notifies the client of a distribution disability error. The client that receives the distribution disability error has to wait for the content distribution server to be released from the distribution disability state.

SUMMARY OF THE INVENTION

In view of the above, the invention provides a content sending device and a content sending, for enabling the content sending device to execute a predetermined operation instruction even if the request for browse from the client is received while the content sending device is unable to perform content distribution.

In one aspect, a content sending device (or referred as a content distribution server) is provided, having a communication part, a storage part and a controller. The communication part is connectable to an external device. The storage part stores a content and an attribute information of the content. The controller sends the content based on a request from the external device. If the controller is unable to send the content, the controller sends the attribute information comprising a predetermined operation instruction to the external device and executes an operation based on the operation instruction from the external device.

According to the aforementioned disclosure, when receiving the request for browse from the client, the content distribution device is enabled to execute the specific operation instruction even if the content distribution device is in the state of being unable to distribute the content.

DESCRIPTION OF THE EMBODIMENTS

Figure 1:
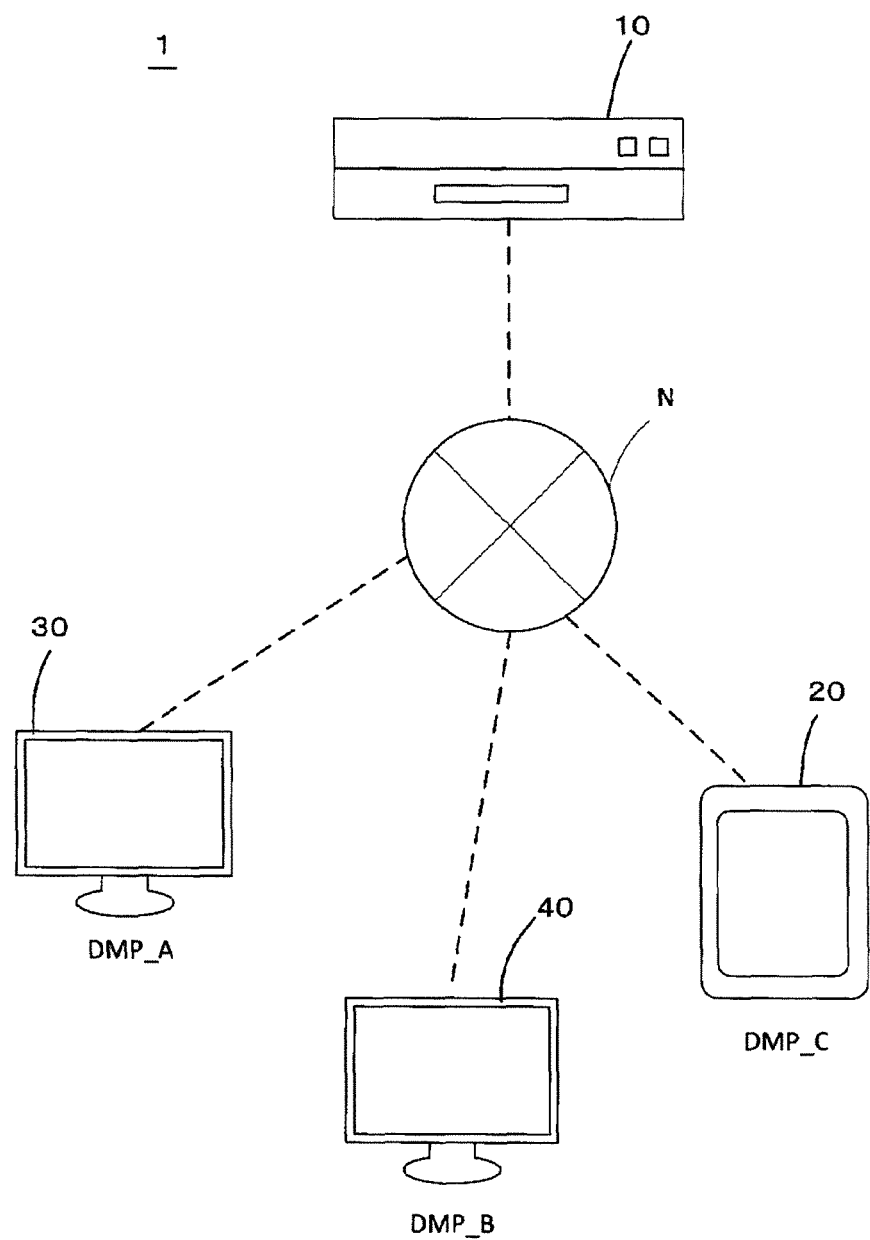
FIG. 1 is a diagram showing the devices that constitute the content distribution system 1 as an example.

Hereinafter, embodiments of the invention are described in the following order.
1. First Embodiment
(1) Configuration of Content Distribution System
(2) Regarding CDS
(3) Browse Method and Content Distribution Method
(4) Effects
2. Second Embodiment
3. Third Embodiment
4. Fourth Embodiment
5. Other Embodiments:
1. First Embodiment:
(1) Configuration of Content Distribution System:

FIG. 1 is a diagram showing devices that constitute a content distribution system (or content sending system) 1 as an example. The content distribution system 1 is a system corresponding to DLNA of UPnP AV. The content distribution system 1 includes a content distribution server 10 that functions as a DMS of the DLNA and clients 20, 30, and 40 that function as DMP. In FIG. 1, the content distribution server 10 and the client 20, 30, and 40 are connected to a network N by wired or wireless connection. The network N is a LAN (Local Area Network) or the Internet. Of course, in the case where the network N is the Internet, the content distribution server 10 or the clients 20, 30, and 40 are connected to the network N via a router or an access point (not shown). In addition, the content distribution server 10 may be also referred as a content sending device, and the client may be also referred an external device.

Figure 2:
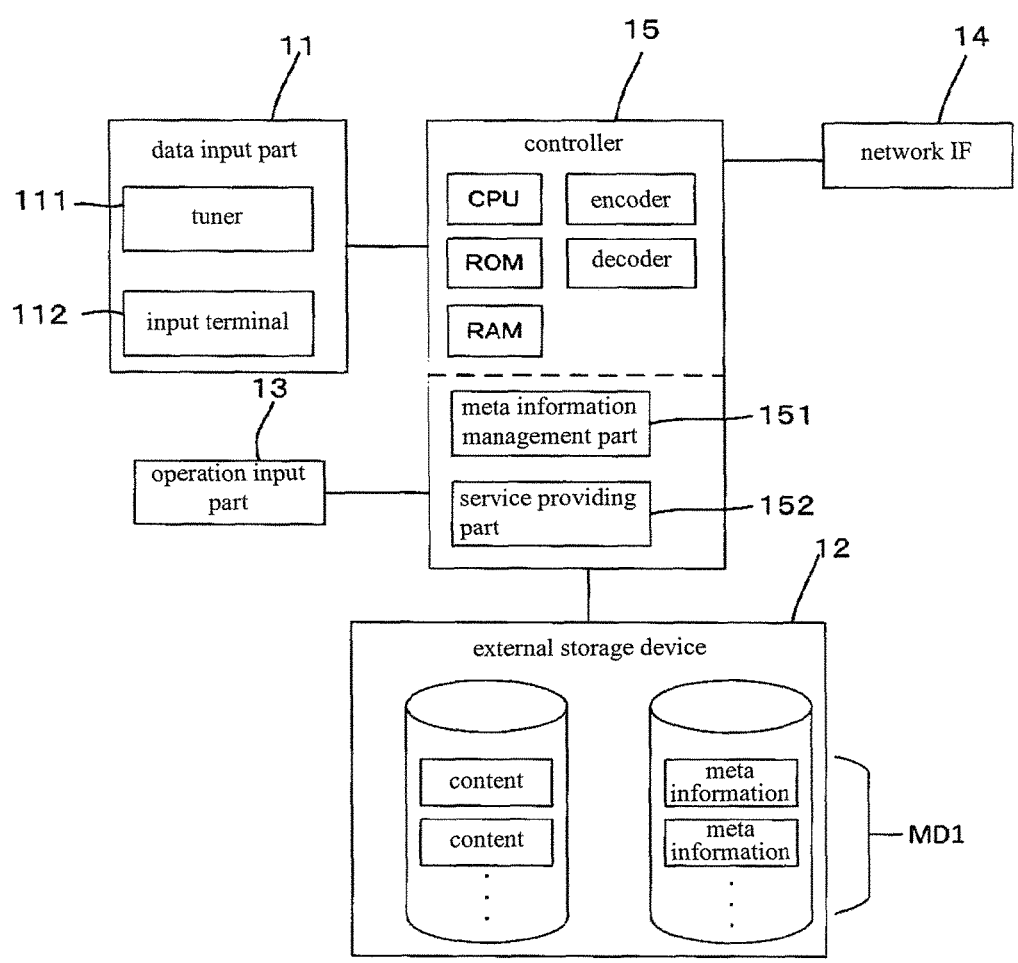
FIG. 2 is a block diagram of the content distribution server 10.

FIG. 2 is a block diagram of the content distribution server 10. The content distribution server 10, as shown in FIG. 2 for example, is a recorder that stores a content, such as video and audio, in an external storage device. The content distribution server 10 includes a data input part 11 that receives a television broadcast or external input from an external equipment (not shown), an external storage device 12 that stores the content and the meta information (attribute information) MD1 of the content, an operation input part 13 that accepts user's operation input and so on, a network interface (IF) 14 for connecting to the network N, and a controller 15 that controls these in an integrated manner.

The data input part 11 is provided with a tuner 111 and an input terminal 112. The tuner 111 receives television broadcast, radio broadcast, and data broadcast (such as terrestrial waves, satellite broadcast waves, and so on). The input terminal 112 accepts digital input or analog input from an external equipment (not shown).

The external storage device 12 is constituted by a magnetic memory (such as HDD (Hard Disk Drive)) or a semiconductor memory (such as SSD (solid state drive). The content stored in the external storage device 12 is, for example, a television broadcast (video signal) recorded by the content distribution server 10 via the data input part 11. The meta information MD1 is XML data that indicates the title, recording date/time, reproduction time, recording location (URL), and so on of the content stored in the external storage device 12. Therefore, the external storage device 12 constitutes a meta information storage part of the invention (corresponding to an attribute information part; the same applies hereinafter). A specific configuration of the meta information MD1 is described later.

The operation input part 13 is provided with an operation key (not shown) or a receiving part that receives input from a remote control device. The network IF 14 is constituted by a LAN card, an NIC (Network Interface Card), and so on for connection to the network N.

The controller 15 can be an integrated circuit such as SoC, and is provided with a decoder that converts the digital data obtained via the data input part 11 into content data corresponding to the MPEG standard, an encoder that converts and outputs the content data corresponding to the MPEG standard, a CPU that functions as an operation center, a ROM in which a program or data to be executed by the CPU is stored, and a RAM that functions as a work area of the CPU. Moreover, the CPU executes the program stored in the ROM, by which the controller 15 functionally has a meta information management part 151 (corresponding to an attribute information management part; the same applies hereinafter) and a service providing part 152.

The meta information management part 151 executes management of the meta information MD1 stored in the external storage device 12 or an operation instruction corresponding to a CDS (Content Directory Service) of the DLNA. In a browse of the CDS, the meta information management part 151 transmits the meta information MD1 to the clients 20-40. The clients 20-40 are capable of acquiring the URL corresponding to the content from the meta information MD1 provided by a browse to make a request (GET request of HTTP) for distribution of the content based on the URL.

The service providing part 152 processes the request for distribution of the content from the clients 20-40 or a request for the operation instruction (reproduction, stop, seek, and so on of the content) that is performed with distribution of the content in accordance with AV Transport of the DLNA. An executing part of the invention is realized by the service providing part 152. Other functions of the meta information management part 151 and the service providing part 152 are described later.

Figure 3:
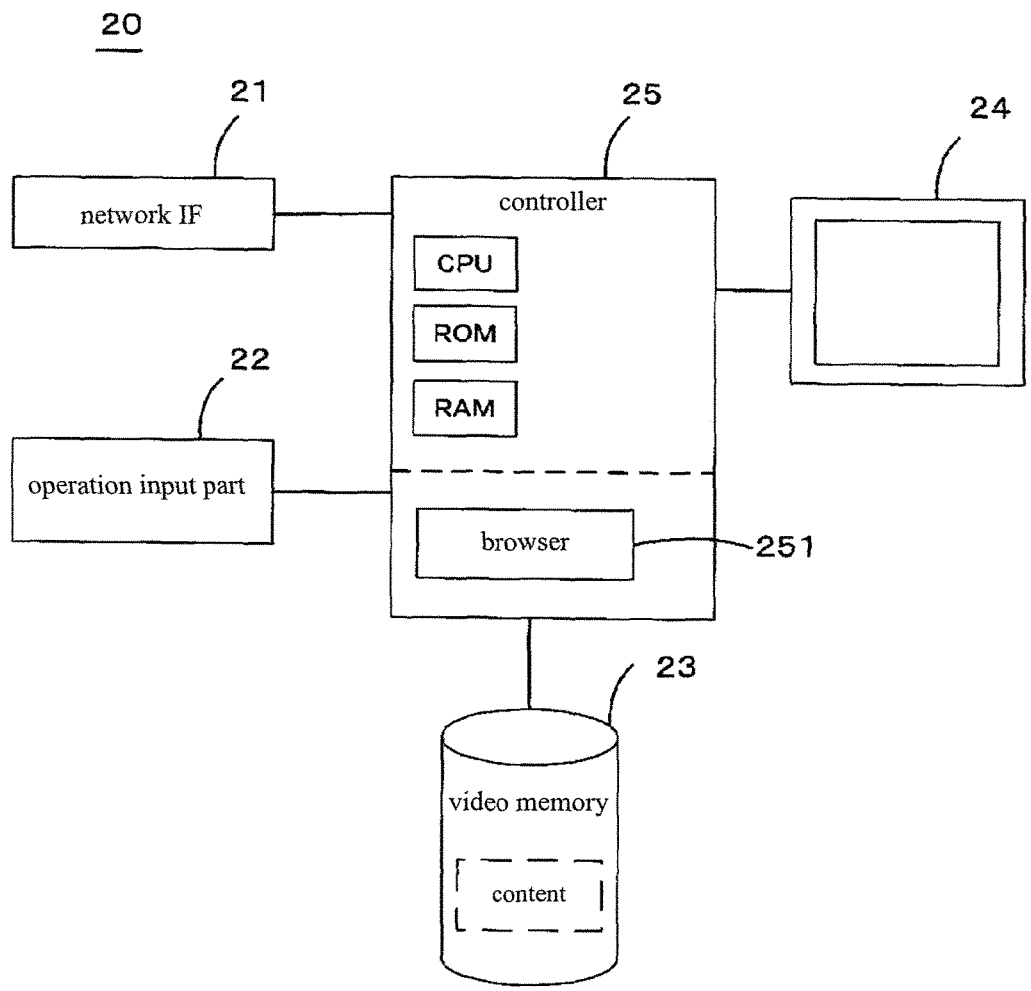
FIG. 3 is a block diagram of the client 20.

FIG. 3 is a block diagram of the client 20. The client device 20, as shown FIG. 3 for example, is a display device that reproduces the content distributed (or sent) from the content distribution server 10. The client 20 is provided with a network IF 21 that is connected with the network N, an operation input part 22 that accepts the user's operation input and so on, a video memory 23 that temporarily stores the content, a display part 24 that displays the content, and a controller 25 that controls these.

The network IF 21 is connected with the network N. The network IF 21 is constituted by a LAN card, an NIC, and so on. The client 20 and the content distribution server 10 can be connected via a network by the network IF 21.

The operation input part 22 can be constituted by a touch panel or an operation key for accepting the user's operation input. The operation input part 22 is connected to the controller 25 and outputs a signal corresponding to the user's operation of the operation input part 22 to the controller 25. The video memory 23 can be a volatile memory such as RAM, in which the content distributed from the content distribution server 10 is temporarily stored.

The display part 24 can be provided with an LCD (Liquid Crystal Display) and a driver for driving the LCD, for example. In addition, in the case where the display part 24 has the function of a touch panel module, the display part 24 serves as the operation input part 22 as well.

The controller 25 can be provided with a CPU, a ROM, and a RAM. The CPU executes a program recorded in the ROM, by which the client 20 achieves the function of an OS (Operating System) or a browser 251.

The browser 251 processes the meta information MD1 (MD2) or the content. The browser has the function of a commonly known web browser and is capable of interpretation of the data (MD1, MD2) written in XML or reproducing the content sent from the content distribution server 10.

(2) Regarding CDS

Figure 4:
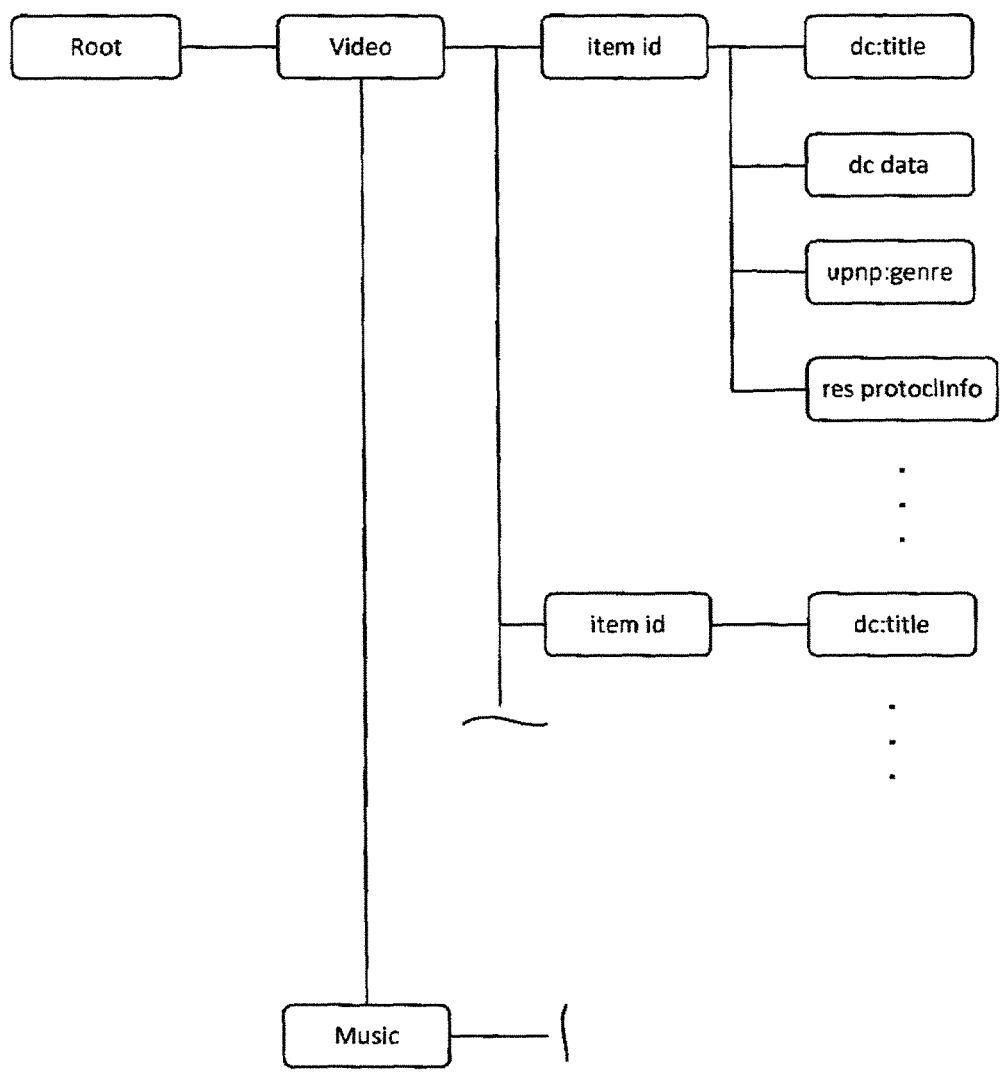
FIG. 4 is a diagram illustrating the structure of the meta information MD1 corresponding to the CDS.

FIG. 4 is a diagram illustrating a structure of the meta information MD1 corresponding to the CDS. The meta information MD1 is managed as a directory structure that is hierarchized according to each tag included in the XML data. In FIG. 4, for example, the structure is hierarchized with "Root" as the vertex and with "Video" and "Music" as the subdirectories, wherein the "Video" and "Music" are elements indicating the type of the content. Among these, in the element "Video," a tag "item id" is hierarchized as a subdirectory and an ID or attribute value for uniquely identifying the content is assigned to the tag "item id." In each "item id," a tag "dc:title" indicating a title of the content, a tag "dc data" indicating generation date/time of the content, a tag "upnp:genre" indicating a genre of the content, and a tag "res protoclInfo" for managing information that is used when a service using the content is provided are hierarchized as subdirectories. Among these, a total reproduction time of the content, a bit rate, an address where the content is recorded, and so on are assigned to the "res protoclInfo" as attributes.

When a request corresponding to the CDS is made from the client, the meta information management part 151 performs an operation instruction based on each tag or element of the directory. For example, in the case where a request for browse is made from the client, the meta information management part 151 specifies the corresponding content based on the tag and sends the element corresponding to the corresponding content as the meta information MD1.

Figures 5A, 5B:
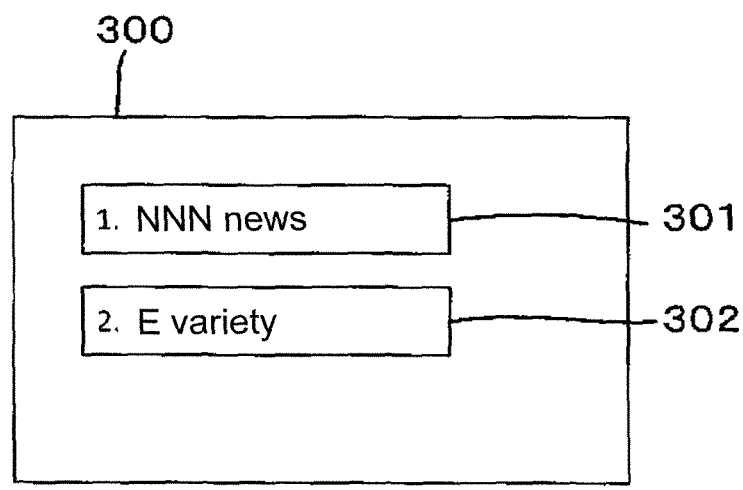
FIG. 5A and FIG. 5B are diagrams illustrating the meta information MD1 generated by the content distribution server 10 and the content list displayed on the client based on the meta information MD1.

FIG. 5A and FIG. 5B are diagrams illustrating the meta information MD1 generated by the content distribution server 10 and a content list displayed on the client based on the meta information MD1. FIG. 5A is the meta information MD1, in which the element of the tag "item id" relates to two contents, i.e., "9010" and "9011." Elements "NNN news" and "E variety" of the tag "dc:title" which indicates the title of the content as a sub element are respectively subordinate to each tag "item id."

By acquiring the meta information MD1 by the GET of HTTP and processing the meta information MD1 by the browser 251, the client is capable of displaying the content list 300 that includes list icons 301 and 302 as shown in FIG. 5B. The content list 300 is used for the user to use the list icons 301 and 302 to select the icon that becomes the object of a re-browse request or a distribution request.

(3) Browse Method and Content Distribution Method

Figure 6:
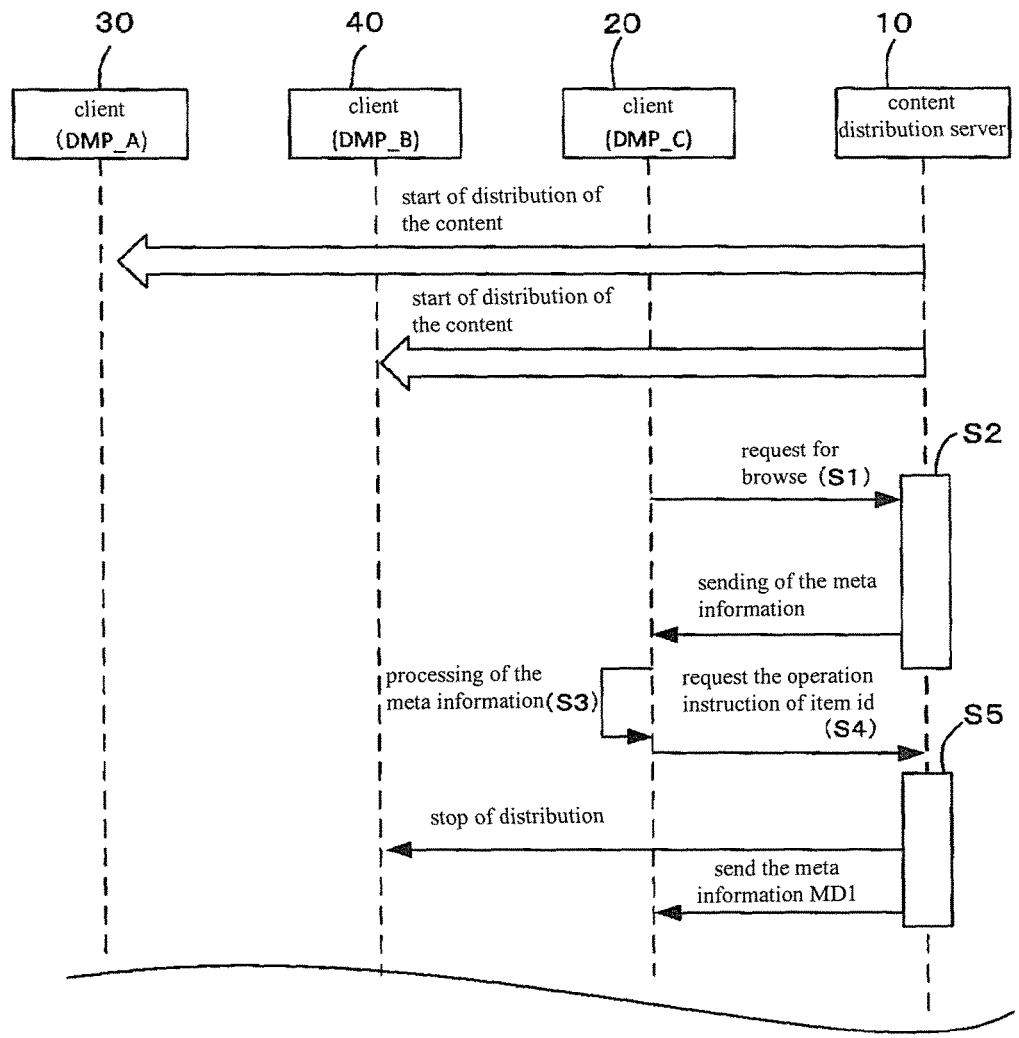
FIG. 6 is a timing chart illustrating a process performed between the content distribution server 10 and the clients 20-40.

Next, a browse performed by the content distribution server 10 according to this embodiment and distribution of the content started corresponding to the browse are described. FIG. 6 is a timing chart illustrating a process performed between the content distribution server 10 and the clients 20-40. In the example shown in FIG. 6, it is set that pairing between the content distribution server 10 and the clients 20-40 has already been completed and the content distribution server 10 starts distribution of the content to the clients 30 and 40.

In the example shown in FIG. 6, it is set that the content distribution server 10 has reached a distribution upper limit of the content, which is "2." In this example The distribution upper limit is a value calculated considering capability of the content distribution server 10 and the network bandwidth and configuration, and indicates the number of contents that can be distributed simultaneously by the content distribution server 10 in the first embodiment.

In Step S1 of FIG. 6, a request for browse is made from the client 20 to the content distribution server 10. The browser 251 of the client 20 uses the GET request of HTTP to make the request for browse to the content distribution server 10.

In Step S2, the content distribution server 10 responds to the request for browse from the client 20. In this embodiment, the meta information management part 151 of the content distribution server 10 switches the information sent by the browse to the normal meta information MD1 or information obtained by processing the meta information MD1 (referred to as "processed meta information MD2" hereinafter) according to a state of the content distribution server 10 (whether the distribution upper limit of the content is reached). The processed meta information MD2 is data to provide an UI (operation instruction list) for that the browser 251 of the client 20 processes the MD2 to make the user select an operation instruction to be executed by the content distribution server 10 (service providing part 152).

Figure 7:
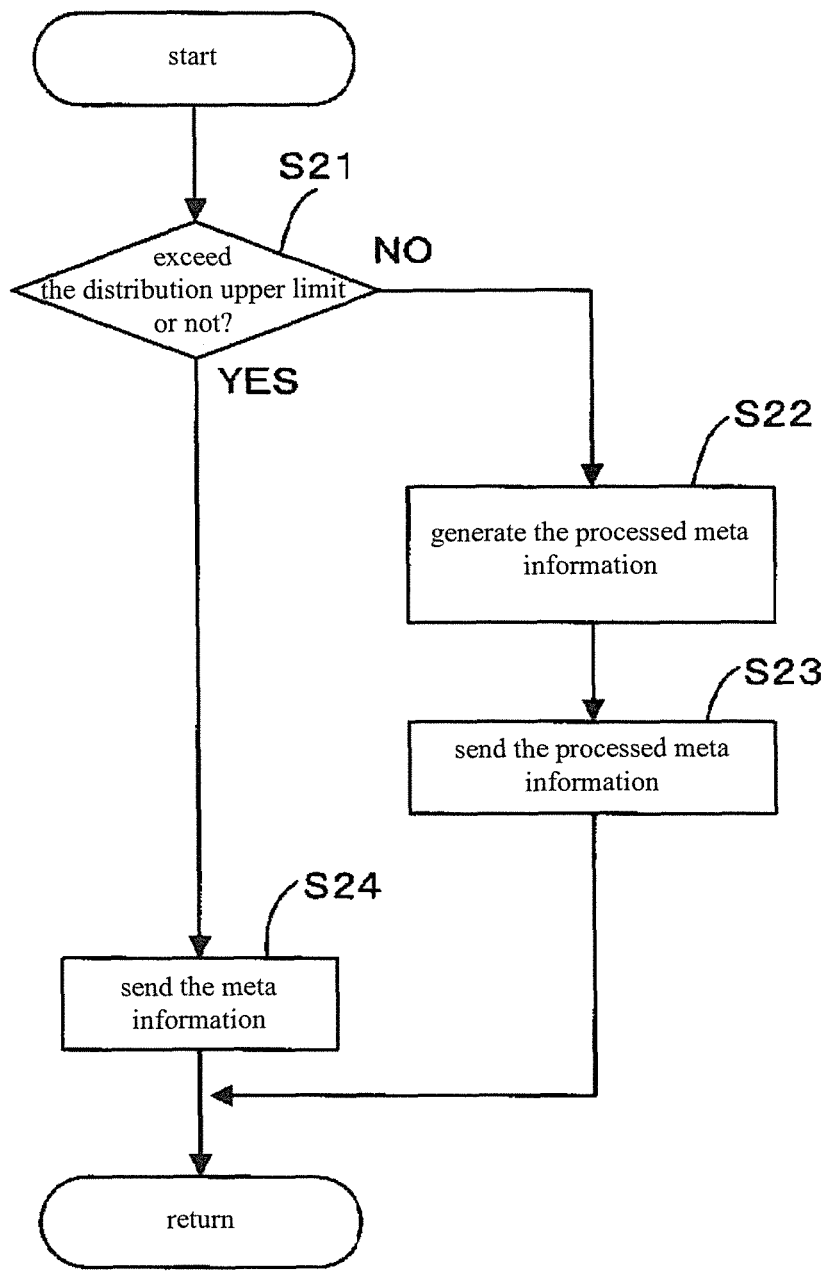
FIG. 7 is a flowchart illustrating a process implemented by the content distribution server 10 in Step S2 of FIG. 6.

FIG. 7 is a flowchart illustrating a process implemented by the content distribution server 10 in Step S2 of FIG. 6. FIG. 7, as an example, illustrates the browse implemented by the content distribution server 10.

In Step S21, the meta information management part 151 of the content distribution server 10 determines whether the distribution upper limit is reached. In this embodiment, since the distribution upper limit is the distribution number 2 which means that two contents can be distributed, the meta information management part 151 determines that the distribution upper limit has been reached if the distribution number of the content distribution server 10 is "2."

If the distribution upper limit is not reached (Step S21: YES), in Step S24, the meta information management part 151 sends the meta information MD1 to the client 20 via the network IF 14.

If the distribution upper limit has been reached (Step S21: NO), in Step S22, the meta information management part 151 processes the meta information MD1 to generate XML data (processed meta information MD2) for the client to display the operation instruction list.

Figures 8A, 8B:
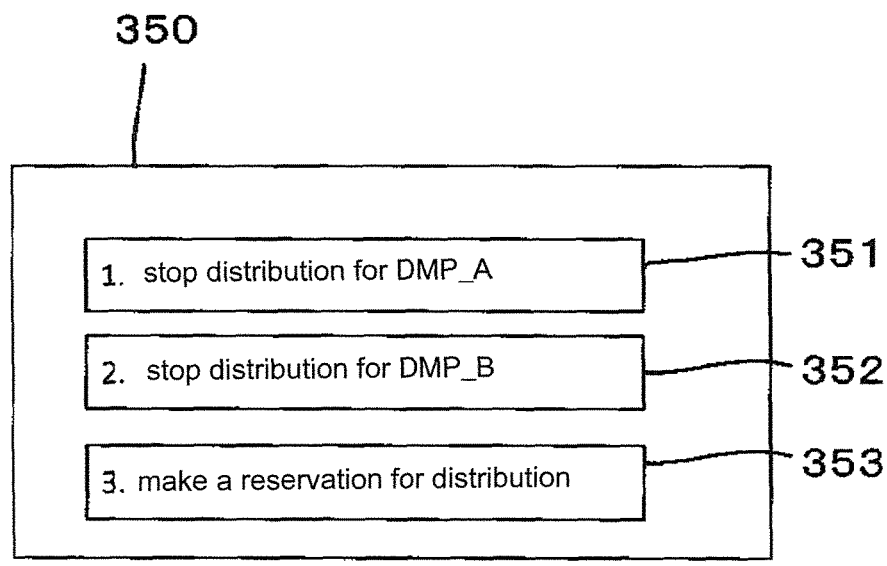
FIG. 8A and FIG. 8B are diagrams illustrating the processed meta information MD2 generated by the meta information management part 151 in Step S22 of FIG. 7 and the operation instruction list displayed by the client 20 based on the processed meta information MD2.

FIG. 8A and FIG. 8B are diagrams illustrating the processed meta information MD2 generated by the meta information management part 151 in Step S22 of FIG. 7 and the operation instruction list displayed by the client 20 based on the processed meta information MD2. FIGS. 8A and 8B are an example where three operation instructions to be selected are listed as the processed meta information MD2.

In the processed meta information MD2 as shown in FIG. 8A, elements of "UNTRANS_001," "UNTRANS_002," and "UNTRANS_003" identifying the operation instruction for the client to select are respectively assigned to the tag "item id". "dc:title" is hierarchized as a sub element of the tag "item id." An element "stop of distribution to DMP_A" of the tag "dc:title" refers to an operation instruction that the content distribution server 10 stops distribution of the content to the client 30. An element "stop of distribution to DMP_B" of the tag "dc:title" refers to an operation instruction of stopping distribution of the content to the client 40. "DMP_A" and "DMP_B" are the respective names of the clients 30 and 40, and during the pairing, the elements are set based on the acquired device information. In addition, an element "distribution reservation" of the tag "dc:title" refers to an operation instruction that the content list is sent to the client 20 which has made a reservation when distribution of the content to any client is completed and the distribution upper limit is eliminated. Thus, the selected operation instruction is set to be stored as the element of the tag that identifies the content of attribute information. In this example, the operation instruction of requesting stop of distribution to any DMP is displayed. Nevertheless, the time required thereafter can be displayed as well. This may be achieved by resetting the element "stop of distribution to DMP_A: 33 minutes left" of "dc:title" after confirming the remaining time.

As shown in FIG. 8B, in an operation instruction list 350 shown based on the meta information MD2, icons 351, 352, and 353 based on the element of the tag "dc:title" are displayed. Here, since the meta information MD2 only changes the element of the tag of the conventional meta information MD1, the browser 251 of the client 20 can process the meta information MD2 in the same way as the meta information MD1 to display the operation instruction list 350.

In Step S23 of FIG. 7, the meta information management part 151 sends the meta information MD2 generated in response to the request for browse to the client 20 via the network IF 14. Therefore, the meta information MD2 sent to the client 20 in Step S23 is different from the normal meta information MD1 and does not store information of the content.

Reverting to FIG. 6, in Step S3, the browser 251 of the client 20 displays the operation instruction list 350 by processing the processed meta information MD2 and accepts a selection operation from the user. In the operation instruction list 350 as shown in FIG. 8B, the user selects the operation instruction by selecting one of the icons 351, 352, and 353.

In Step S4, the client 20 sends "item id" selected by the user's operation of the operation instruction list 350 to the content distribution server 10. When each icon 351 of the operation instruction list 350 is operated by the user, the browser 251 sends the "item id" corresponding to the icon by the GET request of HTTP.

In Step S5, the content distribution server 10 interprets the "item id" sent from the client 20 and executes corresponding processing (operation instruction).

Figure 9:
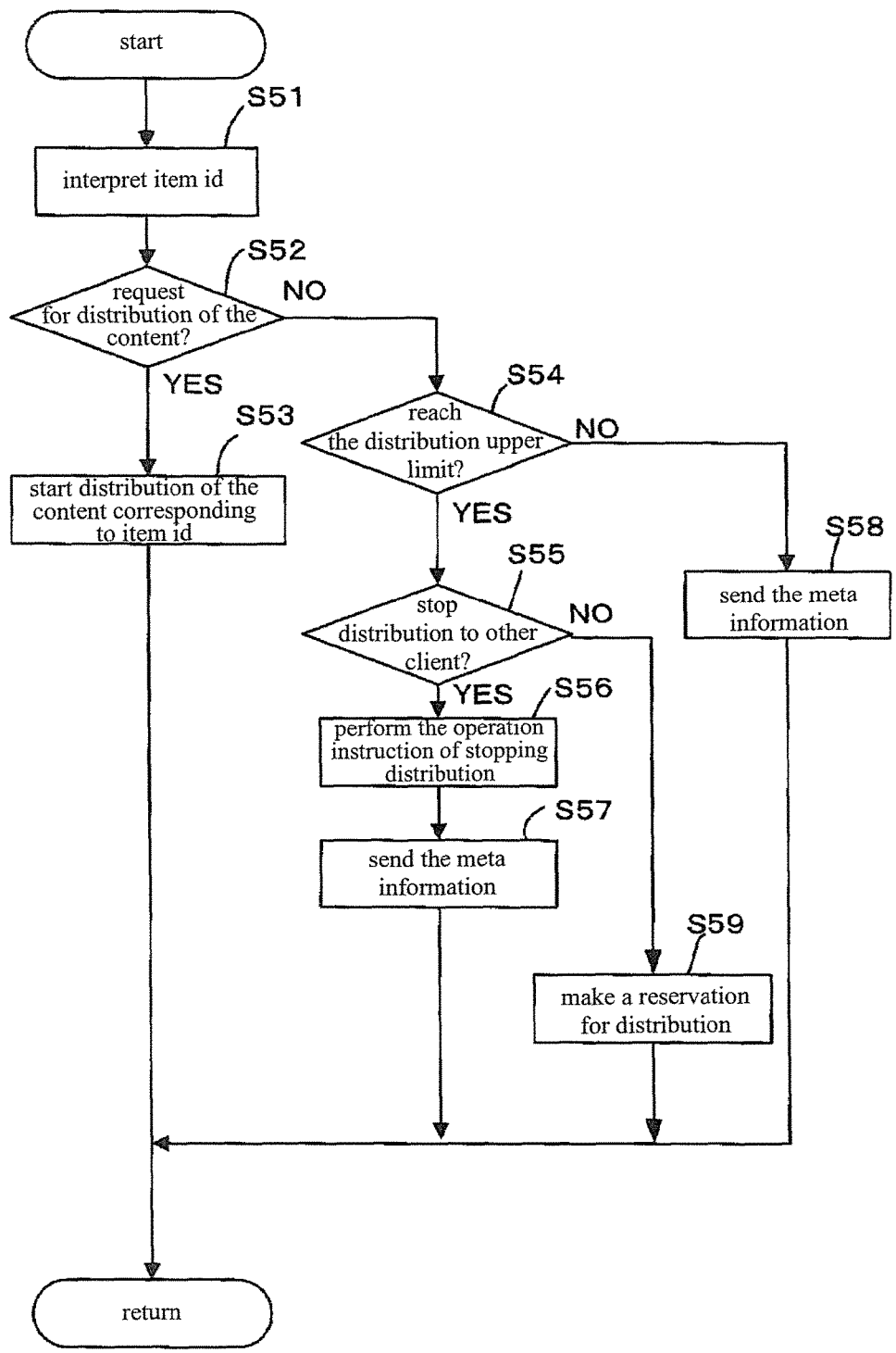
FIG. 9 is a flowchart illustrating a process implemented by the content distribution server 10 in Step S5 of FIG. 6.

FIG. 9 is a flowchart illustrating a process implemented by the content distribution server 10 in Step S5 of FIG. 6. In addition to the case where the "item id" is selected based on the operation instruction list 350 on the side of the client 20, the process shown in FIG. 9 is also executed in the case where the "item id" is selected based on the content list 300 on the side of the client 30.

In Step S51, the service providing part 152 interprets the "item id" sent from the client 20. If the "item id" is the request for distribution of the content (Step S52: YES), in Step S53, the service providing part 152 starts distribution of the content corresponding to the "item id." In this embodiment, because the content distribution server 10 has reached the distribution upper limit, in the process of Step S52, the "item id" does not correspond to the request for distribution of the content.

If the "item id" is not the request for distribution of the content (Step S52: NO), the service providing part 152 proceeds to Step S54 and determines whether the distribution upper limit is reached. While the "item id" is transmitted from the client 20, distribution of the content to the clients 30 and 40, performed by the content distribution server 10, may be completed. In that case, in order that the content distribution server 10 can distribute the content to the client 20, in Step S52, the service providing part 152 determines whether the distribution upper limit is reached.

If the distribution upper limit is not reached (Step S54: NO), in Step S58, the service providing part 152 transmits the meta information MD1 of the content to the client 20. That is, the content distribution server 10 provides browse to the client 20. The client 30 can make a request for the content to the content distribution server 10 by the content list 300 displayed by the browse.

If the distribution upper limit is reached (Step S54: YES), in Step S55, the service providing part 152 determines whether the "item id" is stop of distribution to other clients. If the user selects any operation instruction relating to stop of the distribution in the operation instruction list 350 displayed by the client 20, stop of distribution to other clients is selected.

If the "item id" is stop of distribution to other clients (Step S55: YES), in Step S56, the service providing part 152 stops distribution of the content to the corresponding clients (30, 40) according to the operation instruction corresponding to the "item id." If the "item id" is "UNTRANS_001," the content distribution server 10 stops distribution of the content to the client 30. If the "item id" is "UNTRANS_002," the content distribution server 10 stops distribution of the content to the client 40.

In Step S57, the service providing part 152 distributes the meta information MD1 to the client 20. Therefore, in the client 20, the content list 300 is displayed and thus the request for distribution of the content using the content list 300 can be made.

On the other hand, if the "item id" is not stop of distribution to other clients (Step S55: NO), in Step S59, the service providing part 152 makes a reservation for distribution. The process proceeds to Step S59 if the "item id" is "UNTRANS_003."

Hereinafter, if the content distribution server 10 stops distribution of the content to any of the clients 30 and 40, the meta information MD1 is sent to the client 30. Therefore, the client 20 makes a request for distribution of the content based on the content list 300 that is displayed using the meta information MD1. The content distribution server 10 starts distribution of the corresponding content according to the request for distribution of the content from the client 20. On the other hand, if the client 20 selects distribution reservation, the meta information MD1 is sent to the client 20 after the distribution of the content to any of the clients 30 and 40 is completed.

(4) Effects

As described above, in the first embodiment, if the content distribution server 10 is in the state of being unable to distribute the content when receiving the request for notification of the meta information MD1 from the client 20, the client 20 is notified of the processed meta information (operation instruction information), which records the operation instruction to be executed by the content distribution server 10, instead of the meta information MD1. Then, the content distribution server 10 executes the requested operation instruction when receiving the request for the notified operation instruction information from the client. Thus, when receiving the request for the meta information from the client, the content distribution server can be enabled to execute the specific operation instruction even if the content distribution server is in the state of being unable to distribute the content.

By processing the original meta information MD1 to obtain the operation instruction information (processed meta information MD2), an image corresponding to the operation instruction information can be displayed in the same way as the original meta information MD1 without performing a special process at the client. In this embodiment, the content distribution server 10 distributes the content to the DMP, i.e., the client connected via the network. The external storage device 12 serving as the attribute information storage part stores attribute information of the content sent to the client DMP in response to the request for browse of the content from the client DMP. If the content distribution server 10 is in the state of being unable to distribute the content, the meta information management part 151 serving as the attribute information management part sends the attribute information (meta information MD2) including the predetermined operation instruction when the request for browse is received from the client DMP. Moreover, the process of Step S5 corresponds to the executing part, which executes the requested operation instruction when receiving the request for the notified operation instruction from the client. Here, in the first embodiment, the state of being unable to distribute the content is a state where the distribution limit number of the content has been reached, and the operation instruction is to stop distribution of the content that is being distributed to other clients. In the embodiment, the attribute information (meta information MD2) recording the predetermined operation instruction is generally equivalent to a list of the contents that is obtained by requesting content distribution server from the DMP. That is, a special process for selecting the operation instruction is not required on the side of the DMP, and the display of selectable operation instructions is merely displayed as the title of the content. Then, if the user selects the title of the content corresponding to any operation instruction in the same way as selecting the content of the content distribution server, it only becomes the request for distribution of the content made from the DMP to the content distribution server. In one content distribution server, the meta information MD2 indicating the operation instruction as its content is sent, and if there is any request for distribution, it is regarded as a request for operation instruction from the user to execute the corresponding process. Thus, the aforementioned effect is achieved solely by the side of the content distribution server without any change in the process on the side of the DMP. In other words, the content distribution server can accept a search request from the DMP by utilizing the DMP's search of selection of the content, without changing the DMP.

2. Second Embodiment

Figure 10:
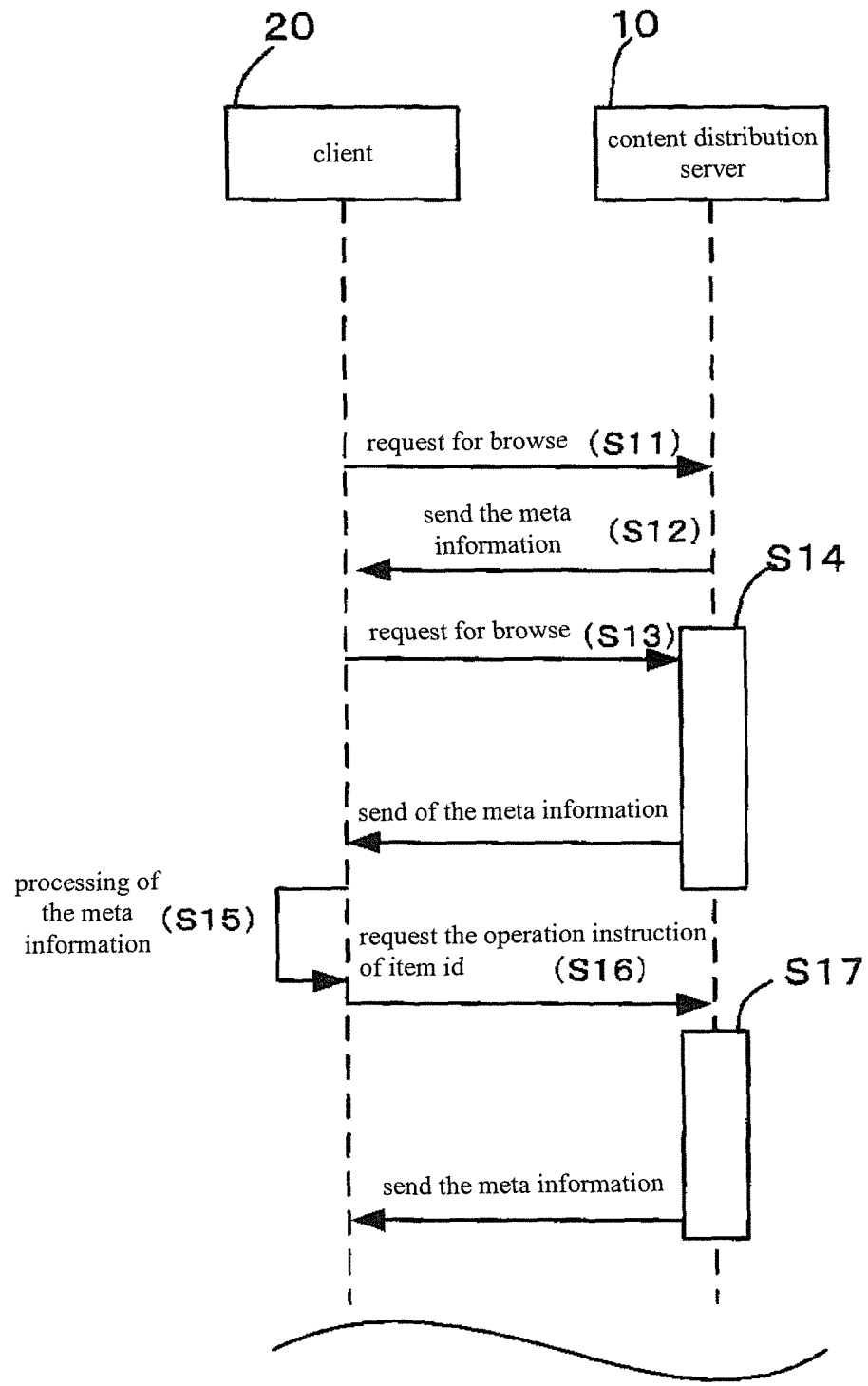
FIG. 10 is a timing chart illustrating a process performed between the content distribution server 10 and the client 20 according to the second embodiment.

The state of being unable to perform distribution may be a state where the content distribution server 10 is dubbing the content. FIG. 10 is a timing chart illustrating a process performed between the content distribution server 10 and the client 20 according to the second embodiment. In the second embodiment, it is set that the pairing between the content distribution server 10 and the client 20 has already been completed and the content distribution server 10 starts dubbing the content.

In Step S11 of FIG. 10, a request for browse is made from the client 20 to the content distribution server 10. In Step S12, the content distribution server 10 sends the meta information MD1 to the client 20 in response to the request for browse from the client 20. In this embodiment, among multiple contents shown by the meta information MD1, a specific content continues to be dubbed. For example, with respect to the content that continues to be dubbed, information showing that the dubbing continues may be included in the meta information.

The browser 251 of the client 20 displays the content list based on the meta information MD1. Then, if the user's re-browse of the specific content is performed based on the displayed content list (Step S13), the content distribution server 10 sends the meta information MD1 or the processed meta information MD2 to the client 20 in response to the request for browse from the client 20 (Step S14). In this embodiment, the meta information management part 151 of the content distribution server 10 switches the information sent by the browse according to whether the selected content continues to be dubbed by the content distribution server 10.

Figure 11:
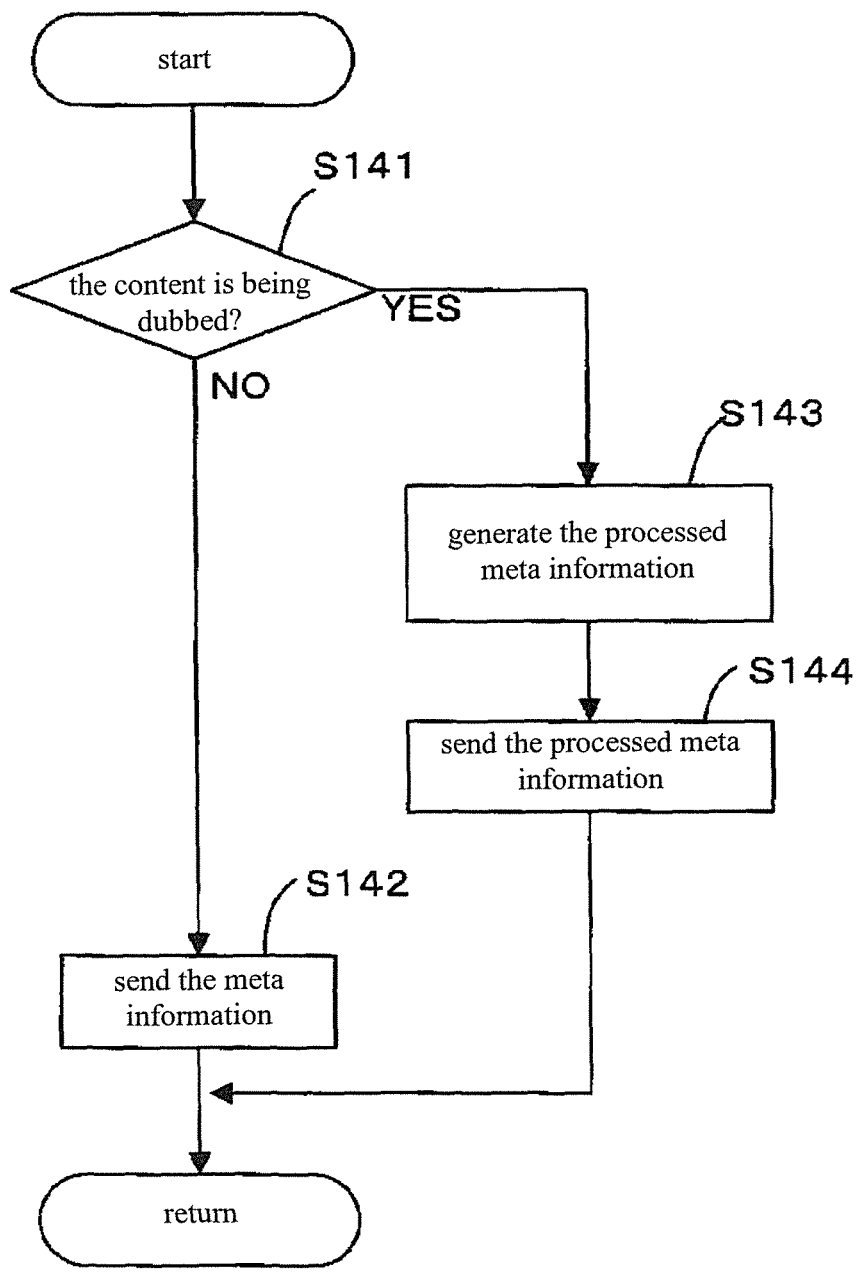
FIG. 11 is a flowchart illustrating a process implemented by the content distribution server 10 in Step S14 of FIG. 10.

FIG. 11 is a flowchart illustrating a process implemented by the content distribution server 10 in Step S14 of FIG. 10.

In Step S141, the meta information management part 151 of the content distribution server 10 determines whether the dubbing of the content continues. If the dubbing does not continue (Step S141: NO), in Step S142, the meta information management part 151 sends the meta information MD1 to the client 20 via the network IF.

Figures 12A, 12B:
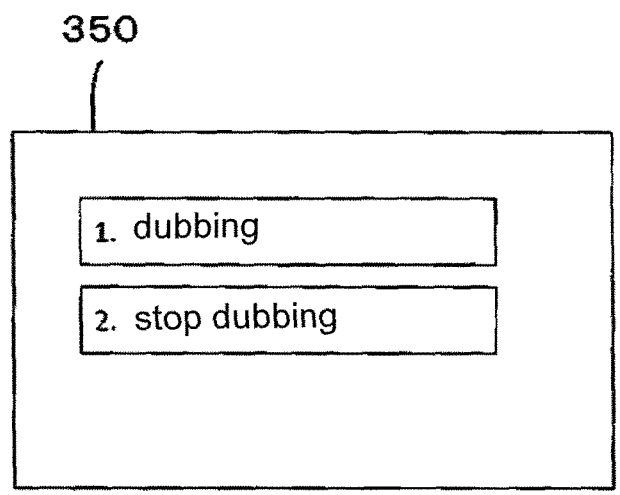
FIG. 12A and FIG. 12B are diagrams illustrating the processed meta information MD2 generated by the meta information management part 151 in Step S143 of FIG. 11 and the operation instruction list 350 displayed by the client 20 based on the processed meta information MD2.

If the dubbing of the content continues (Step S141: YES), in Step S143, the meta information management part 151 processes the meta information MD1 to generate the processed meta information MD2. FIG. 12A and FIG. 12B are diagrams illustrating the processed meta information MD2 generated by the meta information management part 151 in Step S143 of FIG. 11 and the operation instruction list 350 displayed by the client 20 based on the processed meta information MD2. In the processed meta information MD2 as shown in FIG. 12A, elements of "UNTRANS_011 " and "UNTRANS_012" identifying the operation instruction for the client to select are assigned to the tag "item id." An element "continue dubbing" of "dc:title" subordinate to the element "UNTRANS_011" refers to an operation instruction that the meta information MD1 of the content is sent to the client when the dubbing of the content is completed. An element "stop dubbing" of "dc:title" subordinate to the element "UNTRANS_012" refers to an operation instruction of ending the dubbing compulsorily.

In Step S144, the meta information management part 151 sends the processed meta information MD2 generated as a response to the request for browse to the client 20 via the network IF 14.

Reverting to FIG. 10, in Step S15, the browser 251 of the client 20 displays the operation instruction list by processing the processed meta information MD2 and accepts a selection operation from the user. Therefore, the operation instruction list 350 as shown in FIG. 12B is displayed on the client 20.

In Step S16, the client 20 sends the "item id" selected by the user's operation of the operation instruction list 350 to the content distribution server 10. When each icon 351 of the operation instruction list 350 is operated by the user, the browser 251 sends the "item id" corresponding to the icon by the GET request of HTTP.

In Step S17, the content distribution server 10 interprets the "item id" sent from the client 30 and executes the corresponding processing (operation instruction). The process of Step S17 is the same as the first embodiment in that if the operation instruction shown by the "item id" is "stop of dubbing," the service providing part 152 stops the ongoing dubbing of the content compulsorily. As a result, the content list 300 is displayed on the client 20 and thus the request for distribution of the content can be made based on the content list 300. On the other hand, if the operation instruction shown by the "item id" is not stop of dubbing, the service providing part 152 makes a reservation for distribution.

Here, in the second embodiment, the state of being unable to distribute the content is a state when the content is being dubbed, and the operation instruction is to stop the dubbing of the content. As described above, in the second embodiment, the same effect as the first embodiment can be achieved even if the state of distribution disability results from dubbing of the content.

3. Third Embodiment

Using the distribution number of the contents as the distribution upper limit is merely an example. A total transfer amount of the network N may also be used.

Figures 13A, 13B:
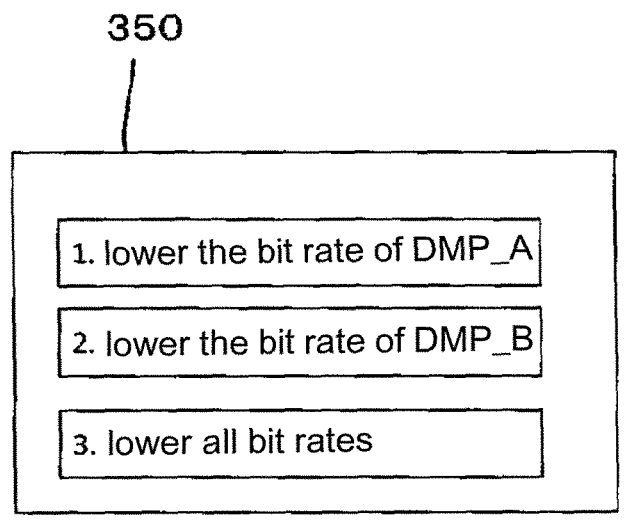
FIG. 13A and FIG. 13B are diagrams showing the processed meta information MD2 generated by the content distribution server 10 according to the third embodiment and the operation instruction list displayed by the client 30.

FIG. 13A and FIG. 13B are diagrams showing the processed meta information MD2 generated by the content distribution server 10 according to the third embodiment and the operation instruction list displayed by the client 30. In the processed meta information MD2 as shown in FIG. 13A, elements "UNTRANS_021," "UNTRANS_022," and "UNTRANS_023" are assigned to the tag "item id," and "dc:title" indicating the title of the operation instruction is hierarchized as a sub element of the tag "item id." An element "lower the bit rate of DMP_A" of "dc:title" subordinate to the element "UNTRANS_021" refers to an operation instruction that the content distribution server 10 lowers a bit rate of distribution of the content to the client 30. An element "lower the bit rate of DMP_B" of "dc:title" subordinate to the element "UNTRANS_022" refers to an operation instruction of lowering a bit rate of distribution of the content to the client 40. An element "lower all bit rates" of "dc:title" subordinate to the element "UNTRANS_023" refers to an operation instruction of lowering the bit rates of distribution of the content to all clients.

The operation instruction list of FIG. 13B is displayed on the client 30 based on the processed meta information MD2 sent from the content distribution server 10. If the user selects "lower the bit rate of DMP_A" or "lower the bit rate of DMP_B," "UNTRANS_021" or "UNTRANS_022" is sent to the content distribution server 10 from the client 20. The content distribution server 10 determines the replied ID and thereby lowers the bit rate of the content distributed to the corresponding client. If the user selects "lower all bit rates," the content distribution server 10 determines the ID and thereby lowers the bit rates of all the contents that are currently distributed. The service providing part 152 distributes content list data to the client 20. Therefore, in the client 20, the content list is displayed and thus distribution of the content from the content distribution server 10 can be performed. Hence, in this embodiment, the state of being unable to distribute the content is a state where the total transfer amount has reached the upper limit of the network, and the operation instruction is to lower the bit rates of the content that is being distributed to other clients.

4. Fourth Embodiment

When the content distribution server 10 performs the operation instruction of stopping distribution of the content to other clients based on a request from the clients, the other clients may be notified that the distribution is stopped. For example, right before stopping distribution of the content to the other clients, the content distribution server 10 combines OSD (On Screen Display) that indicates a character string of the stop of distribution of the content into the content and distributes it to the other client. With the aforementioned configuration, reduction in usability caused by the compulsory distribution stop can be alleviated.

5. Other Embodiments

Using the recorder as the content distribution server is merely an example. Any device capable of distributing the content may be used. Using the processed meta information MD2 obtained by processing the meta information MD1 as the operation instruction information is merely an example. Meta information set with each operation instruction may also be prepared in advance according to the content distribution disability state of the content distribution server.

Needless to say, the invention is not limited to the embodiments described above. It should be understood by those skilled in the art that the following is disclosed as one embodiment of the invention. Mutually substitutable members, configurations, and so on disclosed in the embodiments can be used with their combination altered appropriately. Although not disclosed in the embodiments, members, configurations, and so on that belong to the known technology and can be substituted with the members, configurations, and so on disclosed in the embodiments can be appropriately substituted or be used by altering their combination. Although not disclosed in the embodiments, members, configurations, and so on that those skilled in the art can consider as substitutions of the members, configurations, and so on disclosed in the embodiments are substituted with the above mentioned appropriately or are used by altering their combination.

What is claimed is:

1. A content sending device, comprising:
a communication part connectable to an external device;
a storage part storing a content and an attribute information of the content; and
a controller sending the attribute information comprising a title of the content stored in an element of a tag and sending the content based on a request from the external device if the controller is able to send the content, wherein if the controller is unable to send the content, the controller replaces the title of the content with a predetermined operation instruction, sends the attribute information comprising the predetermined operation instruction stored in the element of the tag to the external device, and executes an operation based on the predetermined operation instruction selected at the external device.

2. The content sending device according to claim 1, wherein the controller stores the predetermined operation instruction in an element of a tag, and the element indicates a title of the content corresponding to the attribute information.

3. The content sending device according to claim 1, wherein if the content is able to be sent, the controller sends the attribute information not comprising the predetermined operation instruction to the external device.

4. The content sending device according to claim 1, wherein if the number of the sent contents exceeds a predetermined value, the controller sends the attribute information comprising the predetermined operation instruction to the external device.

5. The content sending device according to claim 1, wherein if dubbing of the content is being executed, the controller sends the attribute information comprising the predetermined operation instruction to the external device.

6. The content sending device according to claim 1, wherein if a data amount of the sent contents exceeds a predetermined threshold value, the controller sends the attribute information comprising the predetermined operation instruction to the external device.

7. The content sending device according to claim 1, wherein the predetermined operation instruction is an instruction of stopping sending of the content to other external devices.

8. The content sending device according to claim 1, wherein the predetermined operation instruction comprises a notification of a remaining reproduction time of the content that is being sent to other external devices.

9. The content sending device according to claim 1, wherein the predetermined operation instruction is an instruction of stopping the dubbing of the content.

10. The content sending device according to claim 1, wherein the predetermined operation instruction is an instruction of lowering a bit rate of the content that is being sent to other external devices.

11. The content sending device according to claim 1, wherein if the controller is in a state where the content is able to be sent, the controller sends the attribute information to the external device.

12. The content sending device according to claim 1, wherein the attribute information comprises at least one of a title, a recording date/time, a reproduction time, and a recording location of the content.

13. The content sending device according to claim 1, wherein the attribute information comprises the predetermined operation instruction and does not comprise a title of the content.

14. The content sending device according to claim 1, wherein if the controller stops sending of the content to other external devices based on the request from the external device, the controller notifies the other external devices that sending the content is stopped.

15. A content sending method, configured for a content sending device having a communication part connectable to an external device, a storage part storing a content and an attribute information of the content, and a controller, comprising:

determining, by the controller, whether the content is able to be sent or not in response to a request of sending the content from the external device; and replacing a title of the content stored in an element of a tag of the attribute information with a predetermined operation instruction and sending the attribute information comprising the predetermined operation instruction stored in the element of the tag to the external device, by the controller, if it is determined that the content is not able to be sent, and executing, by the controller, an operation based on the predetermined operation instruction selected at the external device.

16. The content sending method according to claim 15, wherein the predetermined operation instruction is generated based on an attribute information related to the content.

17. The content sending method according to claim 15, wherein the predetermined operation instruction comprises at least one of an instruction of stopping sending the content, a notification of a remaining reproduction time of the content, an instruction of stopping dubbing the content, and an instruction of lowering a bit rate of the content.

* * * * *